United States Patent [19]

Asanuma et al.

[11] Patent Number: 5,081,190
[45] Date of Patent: Jan. 14, 1992

[54] BLOCK COPOLYMER OF PROPYLENE AND A PROCESS FOR THE PRODUCTION THEREOF

[75] Inventors: Tadashi Asanuma; Mitsuru Ito; Kaoru Kawanishi, all of Osaka, Japan

[73] Assignee: Mitsui Toatsu Chemicals, Inc., Tokyo, Japan

[21] Appl. No.: 598,783

[22] Filed: Oct. 17, 1990

Related U.S. Application Data

[63] Continuation of Ser. No. 317,552, Mar. 1, 1989, abandoned.

[30] Foreign Application Priority Data

Mar. 1, 1988 [JP] Japan .................................. 63-45782
Oct. 3, 1988 [JP] Japan ................................ 63-247307
Feb. 16, 1989 [JP] Japan .................................... 1-34995

[51] Int. Cl.$^5$ .................... C08F 297/08; C08F 30/08; C08F 275/00
[52] U.S. Cl. .................................. 525/288; 525/268; 525/323; 525/324; 525/478; 525/479
[58] Field of Search ................................ 525/268, 288

[56] References Cited

U.S. PATENT DOCUMENTS 3,223,686 12/1965 Natta et al. ..................... 526/169.3

FOREIGN PATENT DOCUMENTS 8703606 6/1987 World Int. Prop. O. .......... 525/288

Primary Examiner—John C. Bleutge
Assistant Examiner—Vasu S. Jagannathan
Attorney, Agent, or Firm—Burns, Doane, Swecker & Mathis

[57] ABSTRACT

The invention relates to a block copolymer of propylene and a process for preparing the same comprising (a) polymerizing propylene or α-olefins mainly comprising propylene in the presence of a catalyst comprising a transition metal catalyst and an organometal compound; (b) copolymerizing α-olefins mainly comprising propylene and ethylene, wherein in at least one of steps (a) and (b) copolymerization is carried out with an alkenylsilane compound.

10 Claims, No Drawings

BLOCK COPOLYMER OF PROPYLENE AND A PROCESS FOR THE PRODUCTION THEREOF

This application is a continuation of application Ser. No. 317,552, filed Mar. 1, 1989 now abandoned.

FIELD OF THE INVENTION

The present invention relates to a block copolymer of propylene and a process for preparing the same by copolymerization in the presence of an alkenylsilane.

DESCRIPTION OF THE PRIOR ART

Polypropylene is a general-purpose resin that has excellent rigidity but is poor in impact resistance, particularly at low temperatures.

In order to obtain a block polymer of polypropylene that is excellent in both impact resistance and rigidity, various proposals have been made, for example, to change the molecular weight and stereoregularity of the homopolymerized portion, and to change the molecular weight and reaction ratio of ethylene to propylene of the copolymerized part. However, the block copolymers developed are not fully satisfactory, and a block copolymer superior in the balance of physical properties is still desired.

A random copolymer of an alkenylsilane and an olefin is disclosed in U.S. Pat. No. 3,223,686 which is prepared by polymerizing an alkenylsilane and ethylene in the presence of a transition metal compound and an organometal compound.

A process which utilizes an alkenylsilane for producing a crosslinked polymer, particularly, vulcanized rubber, by crosslinking a copolymerized rubber of ethylene and propylene is disclosed in U.S. Pat. No. 3,644,306.

However, a block copolymer of propylene that is useful as a resin and exhibits excellent impact resistance and rigidity has not been previously discovered.

SUMMARY OF THE INVENTION

The present invention overcomes the problems and disadvantages of the prior art by providing a block copolymer of propylene that exhibits both excellent impact resistance and rigidity.

It is an object of the invention to provide a block copolymer of propylene that exhibits excellent rigidity and impact resistance.

It is a further object of the invention to provide a process for preparing a block copolymer of propylene.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a process for preparing a block copolymer of propylene comprising (a) polymerizing propylene or an α-olefin mainly comprising propylene in the presence of a catalyst comprising a transition metal catalyst and an organometal compound, and (b) copolymerizing an α-olefin comprising propylene and ethylene to form a copolymer, wherein in at least one of steps (a) and (b), copolymerization is carried out with an alkenylsilane compound of the general formulas I or II:

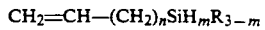

$$CH_2=CH-(CH_2)_n SiH_m R_{3-m} \qquad (I)$$

wherein n is from 0 to 12, m is from 1 to 3 and R is methyl or phenyl;

$$CH_2=CH-(CH_2)_n SiH_p Cl_{3-p} \qquad (II)$$

wherein n is from 0 to 12 and p is from 0 to 3.

The block copolymer of propylene prepared by the process of the invention is excellent in impact resistance and rigidity.

The invention also provides a process for further improving the impact resistance and rigidity of the block copolymer of propylene comprising treating the block copolymer under conditions whereby a silanol bond is formed.

DETAILED DESCRIPTION OF THE PREFERRED EMBODIMENTS

Reference will now be made in detail to the preferred embodiments of the invention.

Suitable catalysts comprising a transition metal catalyst and an organometal compound for use in the process of the invention include catalyst systems having a relatively high activity per catalyst and which give high stereoregularity to the polypropylene produced.

Exemplary suitable transition metal catalysts include catalysts obtained by reducing titanium tetrachloride with an organoaluminum compound and further treating with an electrondonating compound, and supported transition metal catalysts obtained by supporting a titanium halide by a magnesium halide. Suitable transition metal catalysts are those catalysts that are highly active and which give a highly stereoregular polypropylene.

Exemplary suitable supported transition metal catalysts for use in the process of the invention include those prepared by the following processes:

(1) a process comprising contacting a titanium halide with a support prepared by grinding a mixture of a magnesium compound, preferably a magnesium halide compound, and an electron-donating compound, such as an oxygen-containing organic compound for example, a carboxylic acid ester;

(2) a process comprising dissolving a magnesium compound, preferably a magnesium halide or an alkoxymagnesium compound, in a hydrocarbon solvent using an alcohol in the presence or absence of the above described electron-donating compound, and then contacting the solution with a titanium halide to precipitate a complex of magnesium and titanium, which may be further treated by contacting the same with the above-described electron-donating compound and/or a titanium halide as needed.

(3) a process comprising treating a magnesium-containing support obtained by decomposing an alkylmagnesium compound in the presence or absence of the above-described electron-donating compound with a titanium halide in the presence or absence of the above described ester (for example, Japanese Patent Application Laid-open No. 138710/1983).

Exemplary organometal compounds useful in the process of the invention in combination with a transition metal catalyst include organoaluminum compounds, organomagnesium compounds, organozinc compounds, and organolithium compounds. Organoaluminum and organomagnesium compounds are preferred. Preferably, organoaluminum compounds such as trialkylaluminum and dialkylaluminum halides and organomagnesium compounds such as dialkylmagnesium and diarylmagnesium compounds are employed.

Further, on polymerization, an electron-donating compound may be used in combination as a stereoregularity improver. Exemplary suitable electron-donating compounds include esters, ethers, ortho-esters, alkoxysilicons for use as an oxygen-containing organic compound, and amines and amides are useful as a nitrogen-containing compound. Preferably, esters of aromatic carboxylic acids, ortho-alkyl esters, ortho-aryl esters and silicon compounds containing from 1 to 4 alkoxy groups and from 0 to 3 alkyl groups are employed, most preferably the above compounds wherein the alkyl group or the aryl group contains from 1 to 20 carbon atoms are employed.

Preferably, the transition metal catalyst contains from about 0.1 to about 10,000 moles of organometal compound and from about 0.01 to about 1,000 moles of electron-donating compound per mole of titanium.

In the process of the invention, the entire quantity of the organometal compound and/or the electron-donating compound may be added at the start of the process or alternatively, a portion of the organometal compound may be added during polymerization to control the polymerization rate.

Polymerization may be conducted by any known process for polymerizing olefins, for example a slurry polymerization process in which polymerization is carried out in the presence of an inert solvent; a bulk polymerization process in which propylene is used as a liquid medium; and a gas phase polymerization process in which a liquid medium is substantially absent.

Polymerization is generally carried out at from about 25° C. to about 150° C., preferably at from about 40° C. to about 100° C., and at a pressure of from about normal pressure to about 50 kg/cm$^2$.

The polymerization process employed and the polymerization conditions may be the same or different during the different stages of the process of the invention.

In this invention, the homopolymerization of propylene or the copolymerization of $\alpha$-olefins mainly comprising propylene is conducted in the first stage of the process in the presence or absence of an alkenylsilane.

The $\alpha$-olefins suitable for use in the first stage of the process include propylene and $\alpha$-olefins containing propylene and also small amounts, e.g. up to about 6% of other olefins, for example, ethylene and butene-1.

The molecular weight of the polypropylene or the propylene copolymer used in the first polymerization stage is from about 0.5 to about 3 dl/g expressed as the intrinsic viscosity measured in tetralin solution at 135° C. (hereinafter referred to as [$\eta$]). Preferably, the amount of the polymer polymerized is from about 50% to about 95% by weight based on the total polymer.

The copolymerization of $\alpha$-olefins comprising propylene and ethylene is subsequently conducted in the presence or absence of an alkenylsilane compound. There are no particular restrictions regarding the reaction ratio of ethylene to propylene or the molecular weight in the copolymerization reaction. Multi-stage copolymerization processes with varied copolymerization ratios and molecular weights, and known processes generally employed for block copolymers of propylene and ethylene may be employed. In general, the copolymerization ratio of propylene to ethylene is preferably from about 10/90 to about 95/5 by weight, the molecular weight is from about 0.5 to about 20 dl/g expressed as [$\eta$], and the amount polymerized based on the total polymer is preferably from about 50% to about 95% by weight.

The invention also provides a process for preparing a block copolymer comprising (a) copolymerizing propylene and an alkenylsilane to form from about 50% to about 95% by weight of the total polymer and (b) copolymerizing ethylene, propylene and alkenylsilane to form from about 50% to about 5% by weight of the total polymer.

The invention also provides a process for preparing a block copolymer comprising (a) substantially homopolymerizing propylene to form from about 50% to about 95% by weight of the total polymer, and then (b) polymerizing propylene and an alkenylsilane to form from about 20% to about 0% by weight of the copolymer then (c) copolymerizing ethylene, propylene and an alkenylsilane to form from about 50% to about 5% by weight of the copolymer.

The block copolymer of propylene of this invention comprises the homopolymer and copolymers formed in the respective polymerization steps.

In the process of this invention, during at least a part of the first polymerization and/or subsequent copolymerization steps, an alkenylsilane of the general formulas (I) or (II):

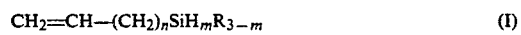
$$CH_2=CH-(CH_2)_nSiH_mR_{3-m} \tag{I}$$

wherein n is from 0 to 12, m is from 1 to 3, and R is methyl or phenyl; or

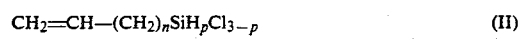
$$CH_2=CH-(CH_2)_nSiH_pCl_{3-p} \tag{II}$$

wherein n is from 0 to 12 and p is from 0 to 3 is employed. Exemplary suitable alkenylsilane compounds include vinylsilane, allylsilane, butenylsilane, pentenylsilane, and compounds thereof wherein from 1 to 2 hydrogen atoms of the Si—H bonds of these monomers are substituted by methyl groups or phenyl groups, or compounds thereof in which from 1 to 3 Si—H bonds are substituted by chlorine.

The alkenylsilane may be added to copolymerize with the $\alpha$-olefin at any stage of the process of the invention. The alkenylsilane may be added at the start or in the middle of the first stage, or subsequent to the first stage during the copolymerization of propylene and ethylene.

When the alkenylsilane is added at the beginning of the process or in the middle of the first stage, a copolymer of propylene and the alkenylsilane is mainly produced. If the unreacted alkenylsilane is transferred to the subsequent copolymerization step, a part thereof also produces a copolymer of the $\alpha$-olefins and the alkenylsilane. If the alkenylsilane is added subsequent to the first stage during the copolymerization stage, a copolymer of ethylene, propylene and alkenylsilane is produced.

The proportion of the alkenylsilane polymerized is preferably from about 0.01% to about 10% by weight of the polymer, and the alkenylsilane content of the total polymer is from about 0.005% to about 5%, preferably from about 0.01% to about 3%. When the alkenylsilane content of the polymer is less than 0.005%, the effect of improving the physical properties is not sufficient, however, if the content exceeds 5%, the flowability of the copolymer becomes poor and thus is less preferred.

Further when the alkenylsilane content of the block copolymer is from about 0.01% to about 10% by weight of the polymer, the block copolymer may be used in mixture with an ordinary polyolefin containing no alkenylsilane.

The copolymer of the invention may be used as a resin and exhibits excellent rigidity and impact resistance.

The rigidity and impact resistance of the block copolymer of propylene of the invention may be further improved by treating the copolymer under conditions whereby the Si—H and/or Si—Cl groups can form a silanol bond, Si—O—Si. Such treatment conditions for forming a silanol bond are known and are set forth, for example, in U.S. Pat. No. 3,644,306.

The most convenient and simple method for forming a silanol bond comprises heat treating the copolymer with water and/or oxygen. Heating is generally carried out at from about 50° C. to about just below the decomposition temperature of the polymer.

A known catalyst effective for forming a silanol bond may also be employed. Exemplary suitable catalysts include compounds selected from the group consisting of organic acids and salts thereof, organic bases, alkoxylates, hydroxides and oxides of alkali metals and alkaline earth metals, for example, siloxane condensation catalysts, particularly alkoxides of alkali metals and tin, lead and the like salts of carboxylic acids.

The catalyst is generally added in an amount of from about 0.001% to about 1% by weight, preferably from about 0.05% to about 0.5% by weight, based on the total polymer. The invention will be further clarified by the following examples, which are intended to be purely exemplary of the invention.

EXAMPLE 1 i) Synthesis of Transition Metal Catalyst A

A vibration mill equipped with 4 grinding pots, each having a capacity of 4l and containing 9 kg of steel balls of 12 mm in diameter was prepared. In a nitrogen atmosphere, each pot was charged with 300 g of magnesium chloride, 60 ml of diisobutyl phthalate and 30 ml of 1,2-dichloroethane, and grinding was effected for 40 hours.

300 g of the above-described ground product were added to a 5l flask, 1.5l of titanium tetrachloride and 1.5l of toluene were added thereto and stirred at 100° C. for 30 minutes, then allowed to stand. The supernatant was decanted off twice, and the solid constituent was washed with 4l portions of n-heptane and repeated 10 times to obtain a transition metal catalyst slurry.

The obtained transition metal catalyst A contained 2.6% by weight of titanium and 4.6% by weight of diisobutyl phthalate.

ii) Synthesis of Transition Metal Catalyst B 700 ml of refined kerosine, 10 g of magnesium chloride and 37 g of 2-ethylhexanol were added to a round bottom flask having a capacity of 2l, and stirred at 100° C. for 24 hours to completely dissolve. 10 ml of diisobutyl phthalate were added thereto, then stirred, and thereafter the whole was gradually added dropwise to 2l of titanium tetrachloride at 0° C. in a round bottom flask of 5l. Then, the temperature was gradually raised, and treatment was effected at 100° C. for an hour. Thereafter, the solid constituent alone was transferred to a 200 ml round bottom flask. Then 100 ml of titanium tetrachloride were added, stirred at 100° C., and finally the solid constituent was washed with n-heptane and repeated 10 times to obtain a transition metal catalyst slurry.

This transition metal catalyst B contained 3.5% by weight titanium and 5.2% by weight diisobutyl phthalate.

iii) Polymerization Reaction

In a nitrogen atmosphere, 20 mg of the transition metal catalyst A, 0.06 ml of triethylaluminum and 0.03 ml of trimethoxyphenylsilane were added to an autoclave having a capacity of 5l followed by 1.8 kg of propylene and 3.3 Nl of hydrogen successively. Polymerization was carried out at 75° C. for 2 hours.

After polymerization, the unreacted propylene was purged, and a part of the polymer was taken out and dried. Further, ethylene and propylene together with vinylsilane were added to the remaining polypropylene, and polymerization was carried out at 50° C. for 30 minutes. The partial pressures of propylene and ethylene were 15 kg/cm$^2$ and 7 kg/cm$^2$ respectively, while the amount of vinylsilane added was 20 g and that of hydrogen was 0.2 Nl. After polymerization, the unreacted gas was purged, the contents were taken out and dried to obtain 620 g of a copolymer.

The intrinsic viscosity [$\eta$] of the powder measured in tetralin solution at 135° C. was 1.38 dl/g for the initial propylene homopolymerized part and 2.05 dl/g for the whole block copolymer, and the ethylene content was 8.5% by weight and the vinylsilane content was 0.02% by weight.

Further, the melt flow index (hereinafter referred to as MI) was measured after adding a known stabilizer and 0.01% by weight of the powder of butyltin laurate and pelletizing.

An injection sheet of 1 mm in thickness was prepared and the physical properties were measured (Example 1-1).

Thereafter, it was treated with boiling water for 2 hours, and the following physical properties values were measured (Example 1-2). The temperature on measurement is set forth in brackets. The results are shown in Table 1.

| | |
|---|---|
| MI | ASTM D1238 [230° C.] |
| Flexural stiffness | ASTM D747-63 [20° C.] |
| Izod (notched) impact strength kg cm/cm$^2$ | ASTM D256-56 [20° C., −10° C.] |
| DuPont impact strength kg cm/$\frac{1}{2}$"$\phi$ | JIS K6718 [20° C., −10°C.] |

COMPARATIVE EXAMPLE 1

Example 1 was repeated except that the copolymerization of ethylene and propylene was conducted without using vinylsilane to obtain a block copolymer having an ethylene content of 8.6% by weight.

The results of the physical properties measurements of the obtained copolymer (Comparative Example 1-1) and after treatment with boiling water (Comparative Example 1-2) are set forth in Table 1.

EXAMPLE 2

Example 1 was repeated except that the transition metal catalyst A was replaced by the transition metal catalyst B, the reaction temperature for copolymerization was set at 40° C.; the ethylene partial pressure was 10 kg/cm², and the vinylsilane was replaced by allylsilane. A copolymer having an ethylene content of 10.2% by weight and an allylsilane content of 0.02% by weight was prepared. The physical properties measurements are set forth in Table 1. Only the physical properties after treatment with boiling water were measured.

COMPARATIVE EXAMPLE 2

Example 2 was repeated except that the allylsilane was not used to obtain a copolymer.

The results are set forth in Table 1. Only the physical properties after treatment with boiling water were measured.

EXAMPLE 3

50 mg of a commercially available highly active titanium trichloride catalyst (highly active titanium trichloride catalyst, produced by Marubeni Solvey Co., Ltd., trade name: TGY-24) and 1 ml of diethylaluminum chloride were added to an autoclave having a capacity of 5l; 1.5 kg of propylene were added, 4.4 Nl of hydrogen were charged, and after heating to an internal temperature of 70° C., polymerization was carried out for 2 hours. Thereafter, the unreacted propylene was purged, then ethylene was charged at a partial pressure 10 kg/cm²-G and propylene was charged at a partial pressure of 15 kg/cm²-G. 20 g of vinylsilane were added followed by 0.3 Nl of hydrogen. Polymerization was carried out at 50° C. for an hour during which the partial pressures of ethylene and propylene were maintained.

After polymerization, the unreacted monomers were purged to obtain 570 g of a powder. The [$\eta$] of the powder was 2.65 dl/g, and the ethylene content was 15.3% by weight and the vinylsilane content was 0.01% by weight.

Using this block copolymer, the physical properties were measured in a manner similar to that in Example 1-2 and the results are set forth in Table 1. Only the physical properties after treatment with boiling water were measured.

EXAMPLE 4

Example 3 was repeated except that the vinylsilane in the copolymerization was replaced by 50 ml of vinylmonochlorosilane.

The copolymer obtained had a [$\eta$] of 2.70 dl/g, an ethylene content of 15.2% by weight and a vinylmonochlorosilane content of 0.1% by weight.

Using this block copolymer, the physical properties were measured in a manner similar to that in Example 1-2. The results are set forth in Table 1. Only the physical properties after treatment with boiling water were measured.

EXAMPLE 5

In a nitrogen atmosphere, 20 mg of the transition metal catalyst A obtained in Example 1, 0.06 ml of triethylaluminum and 0.03 ml of trimethoxyphenylsilane were added to an autoclave having a capacity of 5l, followed by 1.8 kg of propylene and 3.3 Nl of hydrogen successively, and a polymerization reaction was effected at 75° C. for 2 hours. Thereafter, 20 g of vinylsilane were charged thereto under pressure, and the polymerization was further continued for 10 minutes. After this reaction, the unreacted propylene was purged, and a part of the polymer was taken out and dried. Further, the polymerization was effected in the presence of the remaining polypropylene at 60° C. for 40 minutes after adding ethylene, propylene and vinylsilane. The partial pressures of propylene and ethylene were 15 kg/cm²-G and 7 kg/cm²-G respectively, and the vinylsilane and hydrogen were added in amounts of 10 g and 0.2 Nl respectively. After polymerization, the unreacted gas was purged, and the contents were taken out and dried to obtain 670 g of a copolymer.

The powder had a [$\eta$] of 2.14 dl/g and an ethylene content of 8.8% by weight. Further, homopolymerization of propylene was separately conducted, and the proportion of the polymerization and the reaction ratio were calculated for each polymerization. The polymerization of propylene alone was about 80% by weight, the copolymerization of propylene and vinylsilane was about 5% by weight with a vinylsilane content of 0.07% by weight. The polymerization of propylene, ethylene and vinylsilane was about 15% by weight with a vinylsilane content of 0.15% by weight and an ethylene content of 55% by weight.

Further, the MI was measured after adding a known stabilizer and 0.01% by weight of powder butyltin laurate and pelletizing.

Furthermore, an injection sheet of 1 mm in thickness was prepared and the physical properties were measured in a manner similar to that in Example 1 (Example 5-1). Thereafter the sheet was treated with boiling water for 2 hours, and the physical properties were measured (Example 5-2). The results are shown in Table 1.

COMPARATIVE EXAMPLE 3

Example 5 was repeated except that the copolymerization of propylene and ethylene was conducted without any vinylsilane. The results are shown in Table 1. Only the physical properties after treatment with boiling water were measured.

EXAMPLE 6

Example 1 was repeated except that the transition metal catalyst A was replaced by the transition metal catalyst B, the reaction temperature for copolymerization was set at 40° C., the ethylene partial pressure was 10 kg/cm²-G, and the vinylsilane was replaced by allylsilane. The ethylene content was 9.1% by weight and the vinylsilane content was 0.03% by weight. The results are set forth in Table 1. Only the physical properties after treatment with boiling water were measured.

COMPARATIVE EXAMPLE 4

Example 6 was repeated except that allylsilane was not used to obtain a copolymer of propylene and ethylene.

The results of the physical properties measurements are set forth in Table 1. Only the physical properties after treatment with boiling water were measured.

EXAMPLE 7

50 mg of a commercially available highly active titanium trichloride catalyst (highly active titanium trichloride catalyst produced by Marubeni Solvey Co., Ltd., trade name: TGY-24) and 1 ml of diethylaluminum chloride were added to an autoclave having a capacity of 5l, further 1.5 kg of propylene were added, then 5.4 Nl of hydrogen were added and, after heating to an internal temperature 70° C., polymerization was carried out for 2 hours. Then, 10 g of vinylsilane were charged under pressure and polymerization was continued for 20 minutes. Thereafter, the unreacted propylene was purged, 10 kg/cm$^2$-G as a partial pressure of ethylene, 15 kg/cm$^2$-G as a partial pressure of propylene and 20 g of vinylsilane were added followed by 0.3 Nl of hydrogen. Polymerization was effected at 55° C. for an hour during which the partial pressures of propylene and ethylene were maintained. After polymerization, the unreacted monomers were purged to obtain 565 g of a powder.

The powder had a [η] of 2.25 dl/g, an ethylene content of 10.4% by weight and a vinylsilane content of 0.02% by weight.

The results are set forth in Table 1. Only the physical properties after treatment with boiling water were measured.

EXAMPLE 8

Example 7 was repeated except that 50 ml of vinylmonochlorosilane were added upon copolymerization. The obtained copolymer had a [η] of 2.15 dl/g, an ethylene content of 10.8% by weight and a vinylmonochlorosilane content of 0.1% by weight. The results are set forth in Table 1. Only the physical properties after treatment with boiling water were measured.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

2. The process of claim 1 wherein said organometal compound is selected from the group consisting of organoaluminum and organomagnesium compounds.

3. The process of claim 2 wherein said organoaluminum compound is selected from the group consisting of trialkylaluminum halides and dialkylaluminum halides.

4. The process of claim 2 wherein said organomagnesium compound is selected from the group consisting of dialkylmagnesium and diarylmagnesium compounds.

5. The process of claim 1 wherein the temperature is from about 25° C. to about 150° C.

6. The process of claim 1 wherein said α-olefin of step (b) comprises at least about 90% propylene.

7. The process of claim 1 wherein in step (a) copolymerization is carried out with an alkenylsilane compound of the formula (I) to form from about 50% to about 95% by weight of the block copolymer and wherein in step (b) said copolymerization is carried out with an alkenylsilane compound selected from the group consisting of alkenylsilane compounds of the formula (I) and the formula (II) to form from about 50% to about 5% by weight of the block copolymer.

8. The process of claim 1 wherein in step (a) said propylene is homopolymerized to form from about 50% to about 95% by weight of the block copolymer and then copolymerization is carried out with said alkylsilane compound to form from about 20% to about 1% by weight of the block copolymer and wherein in step (b) said α-olefin and ethylene are copolymerized with said alkylsilane compound to form from about 49% to about 4% by weight of said block copolymer.

TABLE I

| Experiment No. | Ethylene Content (wt %) | MI (g/10 min) | Flexural Rigidity (kg/cm$^2$) | Izod Impact Strength (kg cm/cm$^2$) | | DuPont Impact Strength (kg cm/⅛") | |
|---|---|---|---|---|---|---|---|
| | | | | 20° C. | −10° C. | 20° C. | −10° C. |
| Example 1-1 | 8.5 | 5.2 | 11000 | 7.2 | 4.8 | 75 | 52 |
| Example 1-2 | 8.5 | 5.2 | 11500 | 7.5 | 5.2 | 78 | 55 |
| Com. Example 1-1 | 8.6 | 5.4 | 9700 | 6.4 | 4.1 | 75 | 49 |
| Com. Example 1-2 | 8.6 | 5.4 | 9800 | 6.5 | 4.0 | 75 | 50 |
| Example 2 | 10.2 | 6.4 | 9600 | 12.5 | 6.5 | 280 | 70 |
| Com. Example 2 | 10.1 | 6.2 | 9200 | 10.5 | 5.5 | 250 | 65 |
| Example 3 | 15.3 | 7.0 | 10500 | 11.5 | 7.5 | 110 | 60 |
| Example 4 | 15.3 | 7.5 | 11500 | 14.5 | 8.6 | 140 | 70 |
| Example 5-1 | 8.8 | 6.2 | 11800 | 7.4 | 5.2 | 74 | 52 |
| Example 5-2 | 8.8 | 6.2 | 12100 | 7.7 | 5.4 | 77 | 54 |
| Com. Example 3 | 8.6 | 5.4 | 9800 | 6.5 | 4.0 | 75 | 50 |
| Example 6 | 9.1 | 6.7 | 11800 | 9.8 | 5.8 | 120 | 60 |
| Com. Example 4 | 9.3 | 6.4 | 10800 | 8.7 | 4.9 | 110 | 58 |
| Example 7 | 10.4 | 12.0 | 11800 | 11.8 | 7.6 | 110 | 60 |
| Example 8 | 10.8 | 12.8 | 12100 | 12.5 | 7.6 | 120 | 70 |

What is claimed is:

1. A process for preparing a block copolymer of propylene having excellent rigidity and impact resistance and containing from 0.005% to 5% by weight of an alkenylsilane compound comprising (a) polymerizing propylene or an α-olefin comprising at least 94% by weight of propylene in the presence of a stereospecific catalyst comprising a transition metal catalyst and an organometal compound; and (b) copolymerizing an α-olefin comprising a major portion of propylene with ethylene to form a copolymer, wherein in at least one of steps (a) and (b) copolymerization is carried out with an alkenylsilane compound of the formula (I):

$$CH_2=CH-(CH_2)_nSIH_mR_{3-m} \quad (I)$$

wherein n is from 0 to 12, m is from 1 to 3 and R is methyl or phenyl.

9. The process of claim 1 further comprising improving the rigidity and impact resistance of the block copolymer by heating the copolymer with at least one compound selected from the group consisting of water and oxygen, to form a silanol bond.

10. A block copolymer of propylene having excellent rigidity and impact resistance comprising propylene, ethylene and an alkenylsilane compound of the formula (I):

$$CH_2=CH-(CH_2)_nSIH_mR_{3-m} \quad (I)$$

wherein n is from 0 to 12, m is from 1 to 3 and R is methyl or phenyl, wherein said alkenylsilane is present in an amount of from 0.005% to 5% by weight, and a catalyst comprising a transition metal catalyst and an organometal compound.

* * * * *